United States Patent
Lecomte et al.

(10) Patent No.: US 8,445,560 B2
(45) Date of Patent: May 21, 2013

(54) CEMENTITIOUS MATERIALS

(75) Inventors: Jean-Paul H. Lecomte, Bruexelles (BE); Andreas Stammer, Pont-A-Celles (BE); Frederick Campeol, Epinois (BE); Marc Thibaut, Chap. Lez-Herlaimont (BE)

(73) Assignee: Dow Corning Corporation, Midland, MI (US)

( * ) Notice: Subject to any disclaimer, the term of this patent is extended or adjusted under 35 U.S.C. 154(b) by 104 days.

(21) Appl. No.: 12/515,920

(22) PCT Filed: Nov. 21, 2007

(86) PCT No.: PCT/EP2007/062645
§ 371 (c)(1),
(2), (4) Date: Dec. 28, 2009

(87) PCT Pub. No.: WO2008/062018
PCT Pub. Date: May 29, 2008

(65) Prior Publication Data
US 2010/0152332 A1 Jun. 17, 2010

(30) Foreign Application Priority Data
Nov. 22, 2006 (GB) .................................. 0623232.6

(51) Int. Cl.
*C04B 28/02* (2006.01)
*C08K 3/22* (2006.01)

(52) U.S. Cl.
USPC .................... 524/5; 524/4; 524/261; 524/268

(58) Field of Classification Search
USPC ........................................ 524/4, 5, 261, 268
See application file for complete search history.

(56) References Cited

U.S. PATENT DOCUMENTS

| 4,851,047 A | 7/1989 | Demlehner et al. |
| 5,110,684 A | 5/1992 | Cooper |
| 6,268,423 B1 | 7/2001 | Mayer et al. |
| 2005/0204962 A1* | 9/2005 | Luke et al. .................... 106/813 |
| 2006/0249705 A1* | 11/2006 | Wang et al. ............ 252/62.51 C |

FOREIGN PATENT DOCUMENTS

| EP | 0278518 A1 | 8/1988 |
| EP | 0496510 A1 | 7/1992 |
| EP | 0811584 A1 | 12/1997 |
| EP | 0919526 A1 | 6/1999 |
| GB | 1217813 A | 12/1970 |
| GB | 1544142 A | 4/1979 |
| WO | WO 9928264 A1 | 6/1999 |
| WO | WO 0230846 A1 | 4/2002 |

OTHER PUBLICATIONS

English language equivalent for EP 0278518 extracted from espacenet.com database, dated Sep. 1, 2009, 9 pages.
English language abstract for EP 0919526 extracted from expacenet.com database, dated Sep. 1, 2009, 22 pages.
PCT International Search Report for PCT/EP2007/062645, dated Apr. 4, 2008, 3 pages.

* cited by examiner

*Primary Examiner* — John Uselding
(74) *Attorney, Agent, or Firm* — Howard & Howard Attorneys PLLC

(57) ABSTRACT

The present invention relates to cementitious materials, which exhibit a hydrophobic character, and to a process for making cementitious materials hydrophobic, and to a granulated additive for rendering cementitious material hydrophobic. An emulsifier for the organosilicon component is deposited on the particulate carrier together with the organosilicon component and the binder. The hydrophobing agent permits to impart instantaneous hydrophobicity to cementitious materials.

18 Claims, No Drawings

CEMENTITIOUS MATERIALS

RELATED APPLICATIONS

This application claims priority to and all the advantages of International Patent Application No. PCT/EP2007/062645, filed on Nov. 21, 2007, which claims priority to Great Britain Patent Application No. GB 0623232.6, filed on Nov. 22, 2006.

The present invention relates to cementitious materials, which exhibit a hydrophobic character. The invention also relates to a process for making cementitious materials hydrophobic, and to a granulated additive for rendering cementitious material hydrophobic.

It has, for a long time, been desirable for cementitious materials, which have been applied to a substrate, such as an external wall, to be, to some extent hydrophobic. A number of solutions have been suggested in the past including the post-treatment of previously applied cementitious material and the addition of hydrophobing additives to cementitious materials prior to their application to a substrate. In the most common situations hydrophobing additives are added immediately prior to or during the process of applying the cementitious material to a substrate. It is, however, preferred to provide a cementitious material which has incorporated therein a hydrophobing agent or additive prior to application to a substrate, even more preferably at the stage where the cementitious material is in a dry, powdery form.

EP 0811584 describes a granulated hydrophobing additive in cement. The granulated additive comprising an active organopolysiloxane component, a water-soluble or water dispersible binder and water-soluble, water-insoluble or water dispersible carrier particles. The additive is readily dispersible in cementitious materials upon the addition of water due to the non-hydrophobic nature of the granules. All of the carrier particles identified as suitable for this purpose were inactive and wettable in water, e.g. calcium carbonate. The use of this organopolysiloxane hydrophobing agent provides excellent hydrophobic properties to cementitious materials. However, the effectiveness of the hydrophobic properties were observed to increase with each wetting of the applied cementitious material, particularly when the binder and carrier were water soluble materials, and as such provided limited initial hydrophobic protection when compared with traditional hydrophobers used in the industry such as metal soaps. For many uses, instant hydrophobisation of the cementitious material is desirable.

WO 02/30846 describes a granulated hydrophobing additive comprising from 50 to 90 parts by weight of a salt or ester of palmitic, stearic or oleic acid salt, from 20 to 50 parts by weight of a water-soluble or water-dispersible binder and from 0 to 20 parts by weight of an organopolysiloxane.

U.S. Pat. No. 6,268,423 describes building compositions containing hydrophobing powders comprising silica as support material and an organosilicon compound and optionally solvent and/or water and emulsifier.

WO 99/28264 describes a waterproofing additive for cement and/or concrete comprising a pozzolanic material such as silica fume, refined natural microsilica or metakaolin modified with a hydrophobic material such as butyl stearate, calcium stearate, oleic acid or a silicon emulsion.

Although the prior art has provided useful ways of rendering cementitious or other materials hydrophobic there is always a desire for further improvements, especially in the instantaneous hydrophobicity imparted to cementitious materials when the hydrophobing agent is dispersed throughout a set cementitious material such as mortar or renders.

In a process according to the invention for preparing a granulated hydrophobing additive for cementitious material comprising an organosilicon component and a binder polymer deposited on a particulate carrier, the organosilicon component and binder polymer are applied to the particulate carrier from aqueous emulsion.

It has been observed that such a granulated hydrophobic additive is able to provide a high initial hydrophobicity to cementitious materials to which it is applied and that the obtained hydrohobicity can last during a long period of time.

The invention includes a cementitious material in powder form, comprising dry cement and a granulated hydrophobing additive prepared by the above process, the granulated hydrophobing additive being present in an amount sufficient to give from 0.01 to 2% by weight of the organosilicon component based on the weight of dry cement.

A granulated additive is a product resulting from the agglomeration of small size particles, which for example can have a size between 20 and 1000 microns. A granule is typically formed of different components agglomerated or glued together in a single particle, as opposed to ordinary powder additive where solid powder components are physically mixed together so that each component remains as a separate, individual particle.

A granulated additive according to the invention for rendering cementitious material hydrophobic comprises an organosilicon component and a binder polymer deposited on a particulate carrier, and is characterised in that an emulsifier for the organosilicon component is deposited on the particulate carrier together with the organosilicon component and the binder.

The organosilicon component can be an organopolysiloxane. This may be chosen from any known organopolysiloxane materials, i.e. materials which are based on a Si—O—Si polymer chain and which may comprise mono-functional, di-functional, tri-functional and/or tetra-functional siloxane units, many of which are commercially available. It is preferred that the majority of siloxane units are di-functional materials having the general formula $RR'SiO_{2/2}$, wherein R or R' independently denotes an organic component or an amine, hydroxyl, hydrogen or halogen substituent. Preferably R will be selected from hydroxyl groups, alkyl groups, alkenyl groups, aryl groups, alkyl-aryl groups, aryl-alkyl groups, alkoxy groups, aryloxy groups and hydrogen. More preferably a substantial part, most preferably a majority of the R substituents will be alkyl groups having from 1 to 12 carbon atoms, most preferably methyl or ethyl groups. The organopolysiloxane can for example be polydimethylsiloxane (PDMS). Alternatively the organopolysiloxane may comprise methylalkylsiloxane units in which the said alkyl group contains 2-20 carbon atoms. Such methylalkylsiloxane polymers, particularly those in which the said alkyl group contains 6-20 carbon atoms, may confer even higher water resistance than PDMS. One example of such a polymer is a dimethyl methyloctyl siloxane copolymer sold by Dow Corning under the product name 16-846. Blends of organopolysiloxanes can be used, for example a blend of a methylalkylsiloxane polymer with a linear PDMS.

Some of the R groups of the organopolysiloxane can be alkyl groups bearing a trialkoxysilyl moiety to provide appropriate reactivity of the resultant organosiloxane component towards cementitious materials. The trialkoxysilyl moieties have the general formula $(RO)_3SiO_{1/2}$, where R can be a alkyl group having from 1 to 4 carbon atoms. Trialkoxygroups can for example be introduced by a hydrosilylation reaction between an organopolysiloxane containing one or more Si—H groups and an allyl trialkoxysilane. An example of such a polyorganosiloxane is the dimethyl methyloctyl methyl(triethoxysilyl)propyl siloxane copolymer sold by Dow Corning under the product name 16-606.

Although it is preferred that the majority of siloxane units are di-functional siloxane units other units such as tri-functional or tetra-functional units may also be present resulting in the polymer chain exhibiting a certain amount of branching. For example resinous organopolysiloxane materials may be used such as a condensation product of a partially hydrolysed trialkoxysilane such as n-octyl trimethoxysilane or n-octyl triethoxysilane. Blends of such resinous organopolysiloxane materials with a linear polyorganosiloxane such as PDMS can be used.

The total number of siloxane units is preferably such that the organopolysiloxane material has a viscosity of from 1 to a maximum of about 60,000 mm$^2$/s at 25° C. More preferably the viscosity of the siloxane should not exceed about 5,000 mm$^2$/s at 25° C.

The organosilicon component can alternatively be a dialkoxysilane or trialkoxysilane, or a mixture of these with each other or with an organopolysiloxane. The dialkoxysilane generally has the formula $Z_2Si(OZ')_2$ and the trialkoxysilane generally has the formula $ZSi(OZ')_3$ in which Z in each formula represents an alkyl, substituted alkyl, aryl or substituted aryl group having 1 to 20 carbon atoms and each Z' represents an alkyl group having 1 to 6 carbon atoms. The group Z can for example be substituted by a halogen, particularly fluoro, group, an amino group or an epoxy group, or an alkyl group can be substituted by a phenyl group or a phenyl group can be substituted by an alkyl group. Preferred silanes include those in which Z represents an alkyl group having 6 to 18 carbon atoms and each Z' represents an alkyl group having 1 to 4, particularly 1 or 2, carbon atoms, for example n-octyl trimethoxysilane, 2-ethylhexyl triethoxysilane or n-octyl triethoxysilane.

We have found that blends of such preferred silanes with an organopolysiloxane can form highly advantageous hydrophobing additives when granulated via an emulsion according to the present invention. Organopolysiloxanes such as linear polydimethylsiloxane or the dimethyl methyloctyl methyl(triethoxysilyl)propyl siloxane copolymer 'Dow Corning 16-606' are excellent in conferring instantaneous hydrophobic properties. A long chain alkyl trialkoxysilane such as n-octyl triethoxysilane is not always as good in conferring instantaneous hydrophobic properties, but is even better than the organopolysiloxanes for maintaining the hydrophobic properties of the treated cementitious material over time. A blend of the organopolysiloxane and the trialkoxysilane confers excellent hydrophobic properties both instantaneously and over time.

The binder polymer is a film forming material which aids in binding the organosilicon component to the particulate carrier. The binder polymer can be either water-soluble or water-insoluble, that is it can be either dissolved or emulsified in water in the aqueous emulsion of the organosilicon component that is applied to the carrier. Such binder materials (either water soluble or water insoluble) are preferably materials which at room temperature, i.e. from 20 to 25° C., have a solid consistency. Examples of suitable water-soluble or water-dispersible binder materials include polyvinyl alcohols, methyl cellulose, carboxy methyl cellulose, polycarboxylates and other film forming polymers. Examples of suitable water-insoluble but water-dispersible (emulsifiable) binder materials include polymers such as polyvinyl acetate, vinyl acetate ethylene copolymers and acrylate ester polymers. Blends of binder material as described above can be used, for example a blend of a water-soluble binder polymer such as polyvinyl alcohol with a water-insoluble binder polymer such as polyvinyl acetate. Water dispersion of the resultant granules may be facilitated by the appropriate blend of water soluble and water insoluble binder material. Most preferably the water solubility of the binder material should be such that it does not interfere with the hydration process of the cementitious material when water is added to the cementitious material prior to its application or use.

The organosilicon component and binder polymer are applied to the particulate carrier from aqueous emulsion. The emulsifier present can for example be a nonionic, anionic, cationic or amphoteric emulsifier. Examples of non-ionic emulsifiers include polyvinyl alcohol, ethylene oxide propylene oxide block copolymers, alkyl or alkaryl polyethoxylates in which the alkyl group has 8 to 18 carbon atoms, alkyl polyglycosides or long chain fatty acids or alcohols. Some water-soluble polymers such as polyvinyl alcohol can thus act as both binder polymer and emulsifier. In some preferred emulsions polyvinyl alcohol acts as emulsifier and also as part of the binder polymer together with a water-insoluble polymer such as polyvinyl acetate. Examples of anionic surfactants include alkali metal and ammonium salts of fatty acids having 12 to 18 carbon atoms, alkaryl sulphonates or sulphates and long chain alkyl sulphonates or sulphates. Examples of cationic surfactants include quaternary ammonium salts containing at least one long chain alkyl group having 8 to 20 carbon atoms.

The carrier particles may be water-insoluble, water-soluble or water-dispersible. Suitable examples of carrier particles include aluminosilicates (such as zeolite or metakaolin), fly ash, clay materials, lime, calcium carbonates, starch, native starch, methyl cellulose, carboxy methyl cellulose, cement, sand polystyrene beads and polyacrylate beads. It is preferred that the carrier particles have a mean diameter of from 0.1 to 5000 μm, more preferably 0.2 to 1000 μm, most preferably 0.2 to 50 μm. It is preferred to use materials which fulfill a useful role in cementitious compositions per se, for example aluminosilicates or cement itself.

The granulated hydrophobing additive preferably comprises 50 to 85% by weight particulate carrier, from 1 to 10% by weight binder polymer and from 5 to 35% organosilicon component.

Although it is preferred that the granulated hydrophobing additives consist only of the carrier particles, binder(s) and organosilicon component, additional ingredients may be included, for example viscosity modifiers, pigments, colorants, preservatives, gelling agents, pH modifiers, buffers, accelerators, retarders, air entrainers or fillers, e.g. silica and titanium dioxide. It is however preferred that such additional optional ingredients do not comprise more than 5% by weight of the total weight of the additive.

The carrier particles are agglomerated with the organosilicon-binder emulsion potentially in the presence of a co-binder. The main advantage of using an agglomeration process to get an organosilicon-based powder is to get particles which are relatively porous as compared with a spray drying process. The porosity of the powder combined with the use of a water soluble binder enables the powder to be easily redispersible in the application.

It is essential that the hydrophobing additive is granulated, which means that it has been prepared by a granulation process. Granulation methods have been described in a number of patent specifications including EP 0811584 and EP 496510. In the granulation process, the organosilicon component must be emulsified or at least dispersed in the aqueous solution or emulsion of the water-soluble or water-insoluble binder. The resultant emulsion is deposited in a liquid form, for example by spraying, onto the carrier particles e.g. in a fluid bed, thus causing the organosilicon component and binder in admixture to solidify, through the evaporation of water, onto the carrier particles and form a free flowing powder.

In another granulation method the emulsion of organosilicon component and binder polymer is sprayed simultaneously into a drum mixer containing the carrier. The spray droplets partially evaporate on contact with the carrier particles. After mixing, the particles are transferred to a fluidised bed where evaporation is completed with ambient air. The granulated hydrophobing additive is then collected from the fluidised bed. Typical apparatus which is useful for granulation includes the Eirich® pan granulator, the Schugi® mixer, the Paxeson-Kelly® twin-core blender, the Lödige® ploughshare mixer, the Lödige® Continuous Ring Layer Mixer or one of the numerous types of fluidised bed apparatuses, e.g. Aeromatic® fluidised bed granulator. Optionally the particles may be further screened by sieving to produce particles of hydrophobing additive substantially free of any undersized or oversized material.

The amount of granulated hydrophobing additive which is present in the cementitious material according to the invention is such that from 0.01 to 2% by weight of the organosilicon component is present based on the dry weight of cement. More preferably the amount of additive is preferably from 0.25 to 5% by weight of cement and the amount of organosilicon component is 0.05 to 1% by weight based on the weight of cement.

The cementitious material according to the invention may also comprise additional ingredients. These additional ingredients may include sand, filler and other materials traditionally found in cementitious materials, e.g. lime, aggregate, accelerators, air entrainers, pigments, retarders and pozzolanic materials. The cementitious material can for example be cement, concrete, mortar or grout.

A process according to the invention of imparting to cementitious material a hydrophobic character comprises mixing into the cementitious material a granulated hydrophobing additive as described above. Mixing may be done by mechanical means or any other appropriate method known in the art. Mixing can conveniently be carried out by dry mixing the granulated hydrophobing additive with the cementitious material at the stage where is in a dry, powdery form. Alternatively the hydrophobing additives can be added during or after hydration of the cement, for example immediately prior to or during the process of applying the cementitious material to a substrate.

There now follows a number of examples which illustrate the invention. All parts and percentages are given by weight unless otherwise indicated.

PREPARATION OF GRANULATED HYDROPHOBING ADDITIVE

Example 1

200 g of zeolite (DOUCIL 4A from INEOS), having a particle size of about 2 to 5 μm was placed into a domestic kitchen food mixer. 56 grams organopolysiloxane (16-606 from Dow Corning) was mixed in 56 g of an aqueous polyvinyl alcohol solution 5% solid (Celvol 502 from Celanese, Höppler viscosity : 3; 5-4 mPas, 88% hydrolysis) for 3 minutes with a rotor/stator mixer (Ultraturrax). The resultant creamy emulsion was poured over the zeolite in the food mixer under agitation (at maximum mixer speed within a period of 15-30 seconds resulting in a granulated powder). The granulated powder was dried in a fluidised bed for 15 minutes and sieved to remove any particles larger than 0.5 mm diameter.

Example 2

An emulsion made of 16-606 organopolysiloxane (13.5 g), 6.7 g of 25% solution of easily re-dispersible polyvinylalcohol (Celvol SP 05/190 from Celanese, Höppler viscosity: 5 mPas, 84% hydrolysis), 3.4 g of a dispersion of water-insoluble polyvinylacetate-ethylene (Vinamul 3265 from Celanese), 1.4 g of Renex 30 (from Uniquema) non-ionic surfactant and 3.4 g of water was prepared by mixing the different components with a rotor/stator mixer. The granulation step was carried out according to the procedure described in example 1 using 50 g of zeolite. The granulated powder was dried in a fluidised bed for 15 minutes and sieved to remove any particles larger than 0.5 mm diameter.

Example 3

Granules were prepared using the process described in Example 1 but using a silanol end-blocked polydimethylsiloxane of viscosity at 25° C. about 100 mm$^2$/s. as the polyorganosiloxane component and a different polyvinyl alcohol (Celvol SP 05/190 from Celanese, Höppler viscosity: 5 mPas, 84% hydrolysis). An emulsion made of 14.6 g of the silanol ended polydimethylsiloxane, 7.3 g of a 25% solution of Celvol SP05/190 and 7.3 g of water was prepared by mixing the different components with a rotor/stator mixer. The resultant emulsion is poured onto 50 g of zeolite under agitation. The granulated powder was dried in a fluidised bed for 15 minutes and sieved to remove any particles larger than 0.5 mm diameter.

Example 4

An emulsion was made of 16-606 polyorganosiloxane (15.4 g), 7.7 g of 25% solution of Celvol SP 05/190 PVA from Celanese, 3.8 g of a 45% solids dispersion of water-insoluble polyvinylacetate, 1.6 g of Renex 30 (from Uniquema) non-ionic surfactant and 5.5 g of water and prepared by mixing the different components with a rotor/stator mixer. The granulation step was carried out according to the procedure described in example 1 using 100 g of precipitated Calcium carbonate (SOCAL from Solvay) as carrier. The granulated powder was dried in a fluidised bed for 15 minutes and sieved to remove any particles larger than 0.5 mm diameter.

Example 5

200 g of metakaolin (metastar 501 from ECC international) was placed into a domestic kitchen food mixer. 53.7 grams organopolysiloxane (16-846 from Dow Corning) was mixed in 53.7 g of a 45% dispersion of water-insoluble polyvinylacetate, 16.5 g of polyvinyl alcohol solution 10% solid (Mowiol 30-92 from Clariant) and 33 g of water were mixed for 3 minutes with a rotor/stator mixer (Ultraturrax). The resultant creamy emulsion was poured over the metakaolin in the food mixer under agitation. The granulated powder was dried in a fluidised bed for 15 minutes and sieved to remove any particles larger than 0.5 mm diameter.

Example 6

Granules were prepared by pouring an emulsion made of 12.5 g of 16-606 polyorganosiloxane, 6.3 g of 25% solution of Celvol SP 05/190 PVA from Celanese and 3.1 g of water onto 50 g of zeolite. A 45% dispersion of water-insoluble polyvinylacetate (8.7 g) was also poured onto the zeolite at the same time as the polysiloxane emulsion. The modification of the process of preparation correspond to the co-addition of the polysiloxane emulsion and the dispersion of PVAC onto the zeolite under agitation. The granulated powder was dried in a fluidised bed for 15 minutes and sieved to remove any particles larger than 0.5 mm diameter.

Example 7

Granules were prepared by pouring an emulsion made of 16-606 polyorganosiloxane (95.8 g), 96.1 g of a 45% water-insoluble polyvinylacetate dispersion, 9.7 g of Renex 30 surfactant and 48.9 g of water onto 300 g of metakaolin (Metastar 501 from ECC international) under agitation. The granulated powder was dried in a fluidised bed for 15 minutes and sieved to remove any particles larger than 0.5 mm diameter.

Example 8

Granules were prepared by pouring an emulsion made of a silanol end-blocked polydimethylsiloxane of viscosity at 25° C. about 100 mm$^2$/s (73 g), n-octyl triethoxysilane sold under the trade mark Dow Corning Z-6341 (73 g) and 145 g of 20% solution of Celvol 502 from Celanese onto 500 g of zeolite under agitation. The granulated powder was dried in a fluidised bed for 2 minutes and sieved to remove any particles larger than 0.5 mm diameter.

Example 9

104 g of an emulsion made from 50% of Z-6341 n-octyl triethoxysilane and 50% of a 20% solution of Celvol 502 from Celanese was poured onto 138 g zeolite HA from Ineos under agitation. The granulated powder was dried in a fluidised bed and sieved to remove any particles larger than 0.5 mm diameter.

Example 10

Granules were prepared by pouring an emulsion made of silanol end-blocked polydimethylsiloxane of viscosity at 25° C. about 70 mm$^2$/s (43.5 g), n-octyl triethoxysilane sold under the trade mark Dow Corning Z-6341 (43.5 g), 64 g of 20% solution of Celvol 502 PVA from Celanese onto 200 g of zeolite HA from Ineos under agitation. The granulated powder was dried in a fluidised bed for 2 minutes at 60° C. and sieved to remove any particles larger than 0.5 mm diameter.

PREPARATION OF THE CEMENTITIOUS MATERIALS

A mixture of 54 g of sand, 18 g of cement and 1.63 g granulated additive in accordance with present invention (which equates to approximately 0.5% by weight of active material) was introduced into a plastic cup and mixed with a laboratory mixer to homogenize the powder blend. 9 g of water was introduced into the mixture and the mixing was continued for a further 2 minutes. The quantity of powdered additive added for each experiment was calculated according to the actual silicone content of the powder, such as to reach 0.5% of active material in the dry mortar composition. The exact weight of powdered additive for each example is given in Table 1.

The following tests were run on the above cementitious materials according to the invention, on a control sample containing no hydrophobing agent The dry cementitious powder mixture which had been prepared had sufficient water added thereto and the resulting aqueous mixture for each sample was then poured into a pre-prepared test piece mould measuring 100×100×25 mm. The test piece was removed from the mould after 24 hours and allowed to cure in the lab for a further period of 7 days at a temperature of between 16 to 24° C. and at 100% relative humidity.

After seven days, the test pieces were dried. Dry blocks were weighed ($W_{dry}$) and then immersed for a period of one hour in water, with the top surface of the block at a depth of 3 cm below the water surface. After one hours the block was reweighed ($W_{wet}$). The blocks were then re-immersed for 2 additional hours (to reach an immersion time of 3 hours), and reweighed. The same sequence is then re-applied to reach immersion time of 24 hours. Results in Table 1 are obtained by use of the following equation wherein:

$$\text{Percentage Water Pick Up}(WPU\,\%) = \frac{(W_{wet}) - (W_{dry}) \times 100}{(W_{dry})}$$

In order to further exemplify the hydrophobic nature of the resulting cementitious products the contact angle of a 2 μl droplet of water placed on test pieces made according to each of Examples 1 to 8 containing 0.5% by weight of active organosiloxane material was measured and compared to a control test piece containing no hydrophobing additive. The samples 8 bis, 9 and 10 listed in the table 2 were tested at an addition level of only 0.5% of powder in the dry mortar formulation.

Contact angle measurements were obtained using an optical bench installed in the device named "Traker" from the "Teclin" Firm A 2 μl droplet of Water was added at the surface a dry test specimen mounted on the optical bench and the contact angle was measured against time until either the drop was absorbed into the surface or had been lost by evaporation. In the case of the control test piece the contact angle was observed to reduce rapidly in a couple of seconds before being fully absorbed by the test piece, whereas the 2 μl droplet of water placed on the unwetted test pieces comprising granules from example 1 in accordance with the present invention resulted in a constant contact angle of 131° for over one minute until evaporation. It is to be understood that the higher the value of the contact angle the more water repellent the surface.

TABLE 1

| Sample Type | Weight of powder added (g) | 1 hour immersion (% WPU) | 3 hours immersion (% WPU) | 24 hours immersion (% WPU) | Contact angle of a drop of water |
|---|---|---|---|---|---|
| Control | 0 | 8.25 | 8.28 | 8.74 | <20° |
| Example 1 | 1.63 | 0.79 | 1.27 | 4.63 | 131° |
| Example 2 | 1.80 | 0.92 | 1.45 | 5.26 | 139° |
| Example 3 | 1.64 | 1.09 | 2.37 | 6.19 | 134° |
| Example 4 | 2.60 | 0.97 | 1.76 | 8.05 | 108° |
| Example 5 | 2.12 | 0.95 | 2.21 | 5.09 | 50° |
| Example 6 | 1.96 | 0.73 | 1.12 | 3.34 | 105° |
| Example 7 | 1.67 | 0.82 | 1.63 | 4.96 | 130° |
| Example 8 | 1.72 | 0.86 | 1.42 | 2.92 | 116° |

TABLE 2

| Sample Type | Weight of powder added (g) | 1 hour immersion (% WPU) | 3 hours immersion (% WPU) | 24 hours immersion (% WPU) | Contact angle of a drop of water |
|---|---|---|---|---|---|
| Control | 0 | 6.3 | 6.46 | 6.77 | <20° |
| Example 8 bis | 0.36 | 2.54 | 3.51 | 5.38 | 103° |
| Example 9 | 0.36 | 4.18 | 5.2 | 5.86 | 105° |
| Example 10 | 0.36 | 1.89 | 2.71 | 4.73 | 104° |

WPU is water pick-up

It is to be noted that the water pick up on the cement samples containing the granules in accordance with the present invention give significantly improved initial hydrophobicity results compared to the control. The initial hydrophobicity results of the granules in accordance with the present invention are improved over granules as described in EP 0811584.

EASE OF DISPERSION OF THE POWDER IN WATER

Ease of dispersion of the powder in water was tested using the following procedure.
  Test 1: 50 g of water is poured into a transparent plastic container. 1 g of powder is gently deposited at the surface of water. Wetting of the powder and further dispersion into water is assessed visually
  Test 2: 50 g of water is poured into a transparent plastic container. 1 g of powder is gently deposited at the surface of water. The closed bottle is gently shaken for 10 seconds and the amount of powder wetted and or dispersed into water after 1 min is evaluated visually.
  Test 3: 50 g of water is poured into a transparent plastic container. 1 g of powder is gently deposited at the surface of water. The closed bottle is vigorously shaken and the amount of powder wetted and or dispersed into water after 1 min is evaluated visually.

TABLE 3

| | Wetting of powder after 1 min. | Powder wetting with 10 sec of gentle shaking | Powder wetting with 2 min. of thorough shaking |
|---|---|---|---|
| Example 8 | >90% | 100% | 100% |
| Example 3 | >90% | 100% | 100% |
| Zinc stearate | 0% | <10% | <10% |
| Octyl triethoxy Silane adsorbed on silica | 0% | 0% | 0% |
| Powder A from Wacker | 0% | 0% | 0% |
| Seal 80 from Elotex | <10% | ~20% | 100% |

The powder A from Wacker is a powder made from Octyl-triethoxysilane mixed with silica Seal 80 from Elotex is a spray dried powder made of Octyl-triethoxysilane, PVA and Calcium Carbonate.

The invention claimed is:

1. A granulated hydrophobing additive for rendering cementitious material hydrophobic, comprising an organosilicon component and a binder polymer deposited on a particulate carrier so as to form a film, characterised in that an emulsifier for the organosilicon component is deposited on the particulate carrier together with the organosilicon component and the binder polymer, wherein the organosilicon component comprises a dialkoxysilane and/or a trialkoxysilane, and the particulate carrier comprises zeolite, wherein the film comprises the binder polymer.

2. A granulated hydrophobing additive according to claim 1, characterised in that the emulsifier is a water-soluble polymer.

3. A granulated hydrophobing additive according to claim 1, characterised in that the binder polymer is a water-insoluble polymer.

4. A granulated hydrophobing additive according to claim 3, characterised in that the emulsifier comprises polyvinyl alcohol and the binder polymer comprises polyvinyl alcohol and polyvinyl acetate.

5. A granulated hydrophobing additive according to claim 1, characterised in that the organosilicon component further comprises an organopolysiloxane.

6. A granulated hydrophobing additive according to claim 5, characterised in that the organopolysiloxane comprises polydimethylsiloxane.

7. A granulated hydrophobing additive according to claim 5, characterised in that the organopolysiloxane comprises methylalkylsiloxane units in which the alkyl group contains 2-20 carbon atoms.

8. A granulated hydrophobing additive according to claim 7, characterised in that the organopolysiloxane comprises alkyl groups bearing a trialkoxysilyl moiety.

9. A granulated hydrophobing additive according to claim 5, characterised in that the organopolysiloxane comprises a condensation product of a trialkoxysilane.

10. A granulated hydrophobing additive according to claim 1, characterised in that the organosilicon component comprises a trialkoxysilane of the formula $ZSi(OZ')_3$ in which Z represents an alkyl, substituted alkyl, aryl or substituted aryl group having 1 to 20 carbon atoms and each Z' represents an alkyl group having 1 to 6 carbon atoms.

11. A granulated hydrophobing additive according to claim 10, characterised in that Z represents an alkyl group having 6 to 18 carbon atoms and each Z' represents an alkyl group having 1 or 2 carbon atoms.

12. A granulated hydrophobing additive according to claim 1, characterised in that the carrier has a mean particle size of 0.2 to 50µm.

13. A granulated hydrophobing additive for cementitious material prepared by the process of applying an organosilicon component and a binder polymer to a particulate carrier from aqueous emulsion so as to form a film, wherein the organosilicon component comprises a dialkoxysilane and/or a trialkoxysilane, and wherein the particulate carrier comprises zeolite, and wherein the film comprises the binder polymer.

14. A cementitious material in powder form, comprising dry cement and a granulated hydrophobing additive as defined in claim 1 in an amount sufficient to give from 0.01 to 2% by weight of the organosilicon component based on the weight of the dry cement.

15. A process for imparting to cementitious material a hydrophobic character, comprising mixing into the cementitious material a granulated hydrophobing additive as defined in claim 1.

16. A granulated hydrophobing additive for rendering cementitious material hydrophobic as defined in claim 1, wherein the binder polymer comprises polyvinyl alcohol and the emulsifier comprises polyvinyl alcohol.

17. A granulated hydrophobing additive for rendering cementitious material hydrophobic, comprising an alkoxysilane, an organopolysiloxane, a binder comprising polyvinyl alcohol, and a particulate carrier comprising zeolite, characterised in that an emulsifier for the organosilicon component is deposited on the particulate carrier together with the alkoxysilane, the organopolysiloxane and the binder, wherein the binder forms a film.

18. A granulated hydrophobing additive according to claim 1, wherein:
- the organosilicon component is present in an amount ranging from 5 to 35 wt. %;
- the binder polymer is present in an amount ranging from 1 to 10 wt. %; and
- the particulate carrier is present in an amount ranging from 50 to 85 wt. %, all based on the total weight of the granulated hydrophobing additive.

* * * * *